United States Patent [19]
Thomas

[11] Patent Number: 5,264,231
[45] Date of Patent: Nov. 23, 1993

[54] PROCESS FOR TREATING QUINOA SEEDS AND THE PRODUCT OBTAINED

[75] Inventor: Remi Thomas, Berneuil en Bray, France

[73] Assignee: Nestec S.A., Vevey, Switzerland

[21] Appl. No.: 872,035

[22] Filed: Apr. 22, 1992

[30] Foreign Application Priority Data

May 16, 1991 [EP] European Pat. Off. ........... 91107920

[51] Int. Cl.$^5$ .......................... A23B 9/00; A23L 1/20
[52] U.S. Cl. .................... 426/447; 426/510; 426/629
[58] Field of Search .................. 426/447, 510, 629

[56] References Cited

U.S. PATENT DOCUMENTS

3,754,930  8/1973  Toei et al. .
4,911,943  3/1990  Slimak ................................ 426/524

FOREIGN PATENT DOCUMENTS

0061229  3/1982  European Pat. Off. .
0058651  8/1982  European Pat. Off. .

OTHER PUBLICATIONS

Patent Abstracts of Japan, vol. 009, No. 045 (1985) Re: JP-A-59 187 774(1984).
Food Science and Technology Abstracts 1986 AN 86-09-G0017; Romero, et al, "Effect of Extrusion on Functional Properties and Protein Quality of Quinoa (Chenopodium Quinoa)".
World Patents Index Latest Derwent Publications, Ltd. AN90-326429 (43) Re: Soviet Patent Application SU-A-1 531 951 (1989).
Romero, et al., "Efecto de la Extrusion Sabre las Caracteristicas Funcionales y la Calidad Proteinica de la Quinua (Chenopodium quinoa Willd)", *Archivos Latinamericos de Nutricion*, Inst. de Nutr. de Centro América y Panamá (INCAP), Publicación. INCAP E-1148, vol. 35, No. 1, pp. 148-162 (1985).

*Primary Examiner*—Jeanette Hunter
*Assistant Examiner*—Mary S. Mims
*Attorney, Agent, or Firm*—Vogt & O'Donnell

[57] ABSTRACT

Quinoa seeds are moistened so that the seeds have a dry matter content of from 65% to 85% by weight, and then the moistened seeds are treated with superheated steam after which the treated seeds are restored to temperature and pressure conditions to expand the volume of the seeds.

10 Claims, No Drawings

PROCESS FOR TREATING QUINOA SEEDS AND THE PRODUCT OBTAINED

BACKGROUND OF THE INVENTION

This invention relates to a process for treating quinoa seeds and to the product obtained.

Quinoa is a plant which grows at an altitude of 2000 m to 4000 m and which succeeds in developing under difficult conditions. The seed is in the form of a disc approximately 2 mm in diameter and 1 mm thick. It has a more balanced composition than cereals, its protein content being between 14 and 18% by weight and its fat content being around 5% by weight. In addition, the seed is rich in amino acids and has a good balance of lysine, cysteine and methionine.

Accordingly, its agronomic qualities and its nutritional value make it an interesting food source from the outset.

The quinoa seed is consumed either in powder form or whole. In the ground state, it forms a binder for soups or cooked dishes and, whole, it is eaten like rice.

Now, it takes approximately 20 minutes to cook the whole quinoa seed. This cooking time is the main obstacle to the use of the whole quinoa seed.

SUMMARY OF THE INVENTION

Accordingly, the problem addressed by the present invention was to provide a process for treating the whole quinoa seed which would shorten the cooking time to a few minutes which, it has been found, can be achieved by moistening quinoa seeds so that the seeds have a dry matter content of from 65% to 85% by weight, treating the moistened seeds with superheated steam and then restoring the treated seeds to temperature and pressure conditions to expand the volume of the treated seeds.

Expansion of the treated seeds may be obtained simply by restoring the quinoa seeds to atmospheric conditions.

The present invention also relates to quinoa seeds having an apparent voluminal mass of less than 500 g/l.

DETAILED DESCRIPTION OF THE INVENTION

European Patent Application Publication No. 58 651 describes a process and an apparatus for treating animal foods with superheated steam. The superheated steam is obtained by heating steam to a temperature above its saturation temperature. The treatment may be carried out under atmospheric pressure or under pressure. In this case, the steam is obtained by superheating saturated steam kept under pressure.

Superheated steam always tends to revert to the state of saturated steam, giving off its sensible heat in the process. This sensible heat may thus be used to evaporate water and hence to dehydrate a product.

European Patent Application Publication No. 58 651, vertical tubes are interconnected by U tubes. These vertical tubes comprise a double jacket fed with steam to superheat the steam circulating inside the tubes.

Upstream of the first tube, a feed system consisting of a hopper, a first lock and a steam injector enable the product to be introduced into and dispersed in the superheated steam.

Downstream of the last tube, a cyclone separates the treated product from the steam. The steam is recycled and superheated in a heat exchanger before being reintroduced by a fan into the tubular circuit. The treated product is removed from the cyclone through a second lock. In addition, the locks ensure that pressure is maintained in the tubular treatment circuit. A valve system controls the pressure inside the treatment circuit by injection or removal of steam.

In this type of arrangement, the product to be treated is introduced under pressure through the first lock and is dispersed in the flow of superheated steam which then transports the product into the tubular circuit. By means of this process and arrangement for treatment with superheated steam, the product to be treated can be dried in proportions dependent upon the treatment parameters, i.e., the pressure and temperature of the superheated steam and the treatment time.

Now, it has been found that whole quinoa seeds are well suited to transport by the circulation of superheated steam in a tubular circuit of the type in question.

More particularly, it has been found that, on leaving the cyclone, the quinoa seeds undergo controllable expansion during their return to the atmosphere.

As explained above, restoring the quinoa seeds previously treated with superheated steam to atmospheric conditions is accompanied by expansion of the seeds.

This is because the water present in the quinoa seeds vaporizes under the effect of the energy applied by the superheated steam. Since the quinoa seeds are very hard, the steam is trapped in the seed which thus undergoes an increase in pressure whether or not the superheated steam is itself under pressure.

When the seeds are restored to atmospheric conditions, the heat shock, and possibly the pressure difference between the tubular circuit and the atmosphere, give rise to an expansion of the seeds and to entrainment of the steam present in the seeds.

It is therefore appropriate to describe the key parameters which control the expansion process.

It has been found that it is absolutely essential to moisten the quinoa seeds before they are treated with the superheated steam. Paradoxically, therefore, the seeds are hydrated before being dried in order to reduce their dry matter content.

This can be done by immersion in water in a mixer which operates intermittently. The hydration phase preferably lasts 4 hours with stirring of the mixture for 1 minute every 20 minutes.

The dry matter content of the quinoa seeds is thus reduced by the hydration phase from an initial content of 90% by weight to a hydrated moisture content which must be between 65% and 85% by weight.

EXAMPLES

The following Table illustrates the influence of the dry matter content on the non-compacted apparent voluminal mass of the end product and hence on expansion, the seeds having an apparent voluminal mass of the order of 830 g/l before the treatment.

In these tests, the treatment conditions were as follows:

Pressure in the superheated steam treatment enclosure: 1.3 bar
Treatment time: 15 s
Temperature: 207° C.
Throughput: 15 kg/h

| Test | Dry matter content (%) | Apparent voluminal mass after treatment (g/l) | Final dry matter content (%) |
| --- | --- | --- | --- |
| 1 | 90.2 | 540 | 96.0 |
| 2 | 77.5 | 423 | 93.9 |
| 3 | 71.9 | 418 | 93.1 |
| 4 | 66.2 | 435 | 92.1 |
| 5 | 63.9 | 488 | 88.6 |

It can thus be seen that the apparent voluminal mass after treatment passes through a minimum for an initial dry matter content of around 70% by weight.

Besides the dry matter content, the second parameter which controls the degree of expansion of the treated product is the temperature of the superheated steam.

Tests in which the temperature of the steam was varied were thus carried out.

The treatment conditions were as follows:
Pressure in the treatment enclosure: 3.0 bar
Treatment time: 15 s
Initial dry matter content: 72.9% by weight
Throughput: 15 kg/h The following Table illustrates the influence of temperature on the non-compacted apparent voluminal mass and, hence, on the expansion of the product.

| Test | Temperature (°C.) | Non-compacted apparent voluminal mass (g/l) | Dry matter content after treatment (%) |
| --- | --- | --- | --- |
| Control | — | 828 | — |
| 1 | 161 | 648 | 85.25 |
| 2 | 173 | 560 | 88.81 |
| 3 | 187 | 460 | 91.22 |
| 4 | 202 | 408 | 92.82 |

There is thus a very clear change of slope towards 185° C., any increase in temperature beyond that level producing a much lower concomitant increase in the degree of expansion.

It is thus preferable to use steam superheated to a temperature of at least 185.C in order to obtain a good expansion effect.

The third parameter to be taken into account is the treatment time. The optimal treatment time in fact depends to a large extent on the temperature of the steam.

The influence of the treatment time was measured on hydrated seeds having a dry matter content of 71.4% by weight.

The treatment conditions were as follows:
Pressure in the enclosure: 3.0 bar
Temperature of the steam: 199° C.
Throughput: 15 kg/h.

The following Table illustrates the influence of the treatment time.

| Test | Treatment time (in seconds) | Non-compacted apparent voluminal mass (g/l) | Dry matter content after treatment (%) |
| --- | --- | --- | --- |
| 1 | 20 | 496 | 91.4 |
| 2 | 18 | 472 | 91.3 |
| 3 | 16 | 444 | 92.8 |
| 4 | 14 | 435 | 92.5 |
| 5 | 12 | 410 | 93.1 |

The influence of the treatment time is thus evident on the apparent voluminal mass and hence on the expansion of the product and treatment time with the superheated steam of up to 20 seconds are employed.

It can also be seen that reduction of the residence time is accompanied by an increase in the dry matter content. This is a priori paradoxical and is due to the fact that, in a short treatment, drying is minimal, the elimination of water taking place to a greater extent during the expansion resulting from the return to atmospheric conditions. Since the elimination of water is violent, the degree of expansion is greater, resulting in an increase in the exchange surface and an increase in drying.

Finally, it has been found that, paradoxically, the pressure in the enclosure has little effect on the expansion of the final product even though the degree of expansion increases with the pressure prevailing in the enclosure.

The following examples illustrate the influence of the apparent voluminal mass obtained after treatment, and hence the influence of expansion, on the subsequent cooking time.

| Test | Apparent voluminal mass (g/l) | Cooking time (minutes) |
| --- | --- | --- |
| Control | 830 | 20 |
| 1 | 650 | 10 |
| 2 | 500 | 5 |
| 3 | 410 | 3 |
| 4 | 350 | 2 |

It can thus clearly be seen that, because an end product having a predetermined apparent voluminal mass can be reproducibly obtained by the process according to the invention, the cooking time can be drastically shortened.

More particularly and to obtain a significant reduction in cooking time, it is necessary to obtain quinoa seeds having an apparent voluminal mass below 500 g/l.

I claim:

1. A process for treating quinoa seeds comprising moistening quinoa seeds to obtain moistened seeds having a dry matter content of from 65% to 85% by weight, treating the moistened seeds with superheated steam to obtain treated seeds, and then restoring the treated seeds to temperature and pressure conditions to expand the volume of the treated seeds.

2. A process according to claim 1 wherein the steam has a temperature of at least 185° C.

3. A process according to claim 1 wherein the moistened seeds are treated with superheated steam for a time of up to 20 seconds.

4. A process according to claim 1 wherein the moistened seeds are treated with superheated steam at a temperature of at least 185° C. for a time of up to 20 seconds.

5. A process according to claim 1 wherein the treated seeds are restored to atmospheric conditions.

6. A process according to claim 1 wherein the seeds are immersed in water to moisten the seeds.

7. The product of the process of claim 5.

8. The product of the process of claim 2.

9. The product of the process of claim 4.

10. Quinoa seeds having an apparent voluminal mass of below 500 g/l.

* * * * *

UNITED STATES PATENT AND TRADEMARK OFFICE
CERTIFICATE OF CORRECTION

PATENT NO. : 5,264,231
DATED : November 23, 1993
INVENTOR(S) : Remi THOMAS

It is certified that error appears in the above-identified patent and that said Letters Patent is hereby corrected as shown below:

Column 4, line 62, (line 1 of claim 7), "5" should be --1--.

Signed and Sealed this

Nineteenth Day of April, 1994

Attest:

BRUCE LEHMAN

*Attesting Officer*      *Commissioner of Patents and Trademarks*